Patented Mar. 26, 1940

2,195,217

UNITED STATES PATENT OFFICE 2,195,217

PROCESS OF REDUCING MAGNESIUM CONTENT OF ALUMINUM-BASE ALLOYS

Henry Lindenberger and Alfred Sugar, Chicago, Ill., assignors to U. S. Reduction Co., East Chicago, Ind., a corporation of Illinois No Drawing. Application June 17, 1938,
Serial No. 214,252

5 Claims. (Cl. 75—68)

Our invention relates to the treatment of aluminum-base alloys and is particularly concerned with novel and useful methods for effecting the substantial removal or materially decreasing the content of magnetism which may be present therein.

Aluminum is frequently alloyed with magnesium or with magnesium and silicon or with magnesium and other metals such as, for example, copper, zinc and manganese. Once alloyed, it is exceedingly difficult successfully to separate the aluminum from the metals which are usually alloyed therewith. Hence, in the recovery of aluminum from scrap materials containing aluminum alloyed with other metals, as, for example, in the so-called secondary aluminum industry, it is necessary to blend various lots of scrap materials in order to obtain aluminum-base metals of the desired composition. This is unsatisfactory for several reasons among which may be mentioned inconvenience and the restrictions placed upon the sources of scrap aluminum.

In the recovery of aluminum from scrap aluminum-base metals such as turnings, borings, chips, filings, skimmings, drosses, worn-out pistons, cooking utensils, miscellaneous wrought forms and castings, and the like, we have found that, for many purposes, it is highly important to effect the substantial removal or at least to decrease considerably the percentage of magnesium present in the aluminum or aluminum-base alloy. In particular we have found it to be necessary to decrease the magnesium content to at least about 0.1% and preferably substantially lower such as, for example, 0.03% to 0.08%, especially in the popular types of aluminum casting alloys.

Various methods for decreasing the magnesium content of aluminum-base alloys containing magnesium have been suggested heretofore. To our knowledge, however, they have all possessed one or more disadvantages which have militated against their acceptance by the art. Thus, for example, they have been too costly, too slow and cumbersome, they have not been successful in removing magnesium to the extent desired, or their practice has resulted in excessive losses in aluminum. While some of the known methods may be adapted to effect the removal of magnesium down to approximately 0.25%, peculiarly enough they have been unsuccessful in reducing the magnesium content to approximately 0.1% or below without causing excessive losses of aluminum or without bringing about other deleterious results which render the process as a whole commercially unacceptable.

We have discovered that magnesium may be efficaciously removed or the amount thereof decreased to any desired extent in a relatively simple, expeditious and inexpensive manner in accordance with our novel process as hereinafter fully described and claimed.

In general, our invention is predicated upon the discovery that non-volatile slag-forming materials have the surprising property of extracting or removing magnesium from aluminum alloys containing the same when such alloys are brought into intimate contact with said slag-forming materials at temperatures above the melting point of said materials. We have been unable to determine the exact mechanism of this surprising action although we have postulated certain theories to account for the same. Nevertheless, regardless of the exact reasons for such results occurring, we have repeatedly demonstrated that the facts are as stated.

As we have indicated, we have found it to be exceedingly important to provide for intimate contact between the slag-forming material and the magnesium-containing aluminum while both are in the molten state. In our preferred embodiment, this intimacy of contact is effected by mechanically agitating the slag-forming material and the magnesium-containing aluminum as, for example, by means of an agitator arm or blade suitably disposed in a furnace or the like so as repeatedly to bring new surfaces of the molten metal into contact with the molten slag-forming material. Any other means of effecting the mixing or agitation may, however, be utilized.

The process is carried out at a temperature above the melting point of both the particular slag-forming material employed and the aluminum alloy. The upper limit is determined by practical considerations. Thus, for example, it must not exceed the temperature at which the slag-forming material decomposes nor should it be so high as to cause excessive loss of aluminum. In general, it is preferred to operate relatively slightly above the melting point of the slag-forming materials. In the usual case, considering the slag-forming materials hereinafter described, a temperature of about 1400 degrees F. to 1700 degrees F. may be employed and preferably from slightly above 1500 degrees F. to about 1600 degrees F. or not substantially in excess of 1650 degrees F.

The non-volatile slag-forming materials may be selected from a large group including the alkali metal halides such as sodium chloride and potassium chloride, calcium chloride, alkali metal carbonates, and the like. For reasons of economy, sodium chloride is particularly preferred or compositions containing a substantial amount thereof, for example, about 60% or more. Mixtures of the slag-forming materials may also be used efficaciously as, for example, eutectic mixtures such as those of sodium chloride and potassium chloride. Their use enables the employment of lower temperatures in our process since they melt at lower temperatures than the pure or substantially pure salts themselves. If desired, cryolite may be employed in small percentages, for example, up to about 1% or more based on the amount of sodium chloride or the like. The cryolite may be added at any stage of the process, preferably near the end thereof, and serves, among other things, to render the mass more fluid. Any other salt having similar fluidifying properties may be employed in place of the cryolite or it may be omitted altogether. It is preferable, although not necessary, to employ a slag forming material having a specific gravity less than that of the aluminum alloy so that it will float on the surface of the latter.

In order that those versed in the art may even more fully understand the manner in which our invention may be practiced and the advantages emanating therefrom, the following example, illustrative but in no wise limitative of our process, may be considered:

A charge of 10 pounds of sodium chloride was placed in a crucible and melted therein and then 50 pounds of an aluminum-base alloy containing 0.60% magnesium were added thereto. When the entire charge was melted, a temperature of about 1450–1500 degrees F. being utilized, it was stirred vigorously for thirty minutes. The metal was then drawn off from the slag and, on analysis, was found to contain less than 0.01% magnesium. It may be pointed out at this time that the stirring or agitation of the molten metal-molten slag-forming material need not be continuous over the entire time of heating but it must be thorough and sufficient to effect the desired reduction in magnesium content within a reasonable period of time.

When operating with larger batches of materials, for example, containing several thousand pounds of metal, it will be understood that any of the usual equipment or furnaces employed for melting metals may be utilized as, for example, rotary furnaces, pot furnaces, crucibles, and reverberatory furnaces, provided means are supplied for relatively thoroughly or vigorously agitating or stirring the molten mass of metal and slag-forming material. As indicated, this may be done by the provision of a mechanical agitator arm, screw or the like or by any other suitable means.

The ratio of the amount of the magnesium-containing aluminum to the slag-forming material present in the charge is subject to variation. As a practical and economic proposition, the magnesium-containing aluminum is employed in major amount and usually and preferably of the order of five to one by weight although the ratio may, as stated, be greater or smaller.

The order of the mixing of the metal and the slag-forming material is optional although we prefer initially to provide a molten mass of the slag-forming material and charge the metal thereinto, applying heat, if necessary, to insure that the entire mass will remain molten for a length of time sufficient to effect the removal of magnesium to the desired extent considering the extent and thoroughness of the agitation which is imparted to the mass.

As we have indicated, our invention may be practiced in connection with any aluminum-base alloy containing magnesium, particularly where the magnesium content is substantially in excess of 0.1% and it is desired to reduce it to approximately 0.1% and preferably less. Among the alloys which may be treated effectively in accordance with our process are, for example, alloys of aluminum, manganese and magnesium wherein the manganese content is in excess of 1.0% and the magnesium content is 1.0%; alloys of aluminum, copper, manganese, silicon and magnesium wherein the copper content is in excess of 4%, the silicon and manganese each slightly less than 1.0%, and the magnesium content approximately 0.4%. Still other alloys are, for example, those of aluminum, manganese, zinc and magnesium, the latter being present in percentages of the order of 0.4%; and alloys of aluminum with magnesium with or without other metals such as copper, silicon, zinc, manganese and the like wherein the magnesium content is as high as 10.0% and even higher. Peculiarly enough, our process appears to be selective in that magnesium is removed whereas other metals such as copper, zinc, silicon and manganese which may be alloyed with the aluminum remain in the aluminum in substantially the same percentages in which they were present in the original alloy. Furthermore, we have found that magnesium is removed with increased facility, in accordance with our invention, from aluminum alloys having a relatively high content of silicon, for example 8% to 14% and higher.

It will be understood that the length of time required to reduce the magnesium content of an aluminum-base alloy to a desired value will depend upon various factors such as the initial magnesium content and character of the alloy, the temperature at which the process is carried out, and the thoroughness of agitation or mixing of the molten metal and molten slag-forming material. In general, the higher the temperature, the less time and agitation will be required and the lower the temperature, the greater the agitation and time. In most cases, when treating batches of approximately four or five thousand pounds of metal at a temperature of 1550 degrees F. to 1600 degrees F., a period of one and one-half to three hours will be quite satisfactory and the degree of mixing or agitating required to effect this result may be determined accordingly.

Wherever the term "metallic magnesium" is employed in the claims, it will be understood to mean the metal or element itself as distinguished, for example, from oxides thereof.

While we have described our invention in detail, it will be apparent that various changes and modifications may be made without departing from the spirit of the invention as pointed out in the appended claims.

What we claim as new and desire to protect by Letters Patent of the United States is:

1. The method of reducing the metallic magnesium content of aluminum alloys containing the same to approximately 0.1% or less of magnesium which comprises providing a molten mass of said magnesium-containing aluminum alloy and intimately contacting said molten mass with not substantially less than 20% by weight of an alkali metal halide at a temperature above the melting point of the alloy and said alkali metal halide but not substantially in excess of 1650 degrees F., the entire mass being maintained under such conditions for a time sufficient to effect the removal of metallic magnesium to the extent indicated while preventing undue loss of metallic aluminum, the reduction of the metallic magnesium content resulting essentially from the action of the alkali metal halide.

2. The method of claim 1 wherein the alkali metal halide contains a substantial proportion of sodium chloride.

3. The method of removing deleterious quantities of metallic magnesium from aluminum alloys containing up to at least several percent of metallic magnesium which comprises providing a molten bath containing at least a major proportion of sodium chloride and vigorously agitating the same together with a molten mass of said magnesium-containing aluminum alloys to insure relatively intimate contact therebetween, the amount of said sodium chloride being not substantially less than 20% of the weight of said magnesium-containing aluminum alloys, and the entire mass being maintained at a temperature above the melting point of said sodium chloride and said magnesium-containing aluminum alloys but not substantially in excess of 1650 degrees F., the time of contact being sufficient to effect the removal of metallic magnesium to the extent indicated but insufficient to cause any undue loss of metallic aluminum, the removal of the deleterious quantities of metallic magnesium resulting essentially from the action of the sodium chloride.

4. The method of claim 3 wherein said magnesium-containing aluminum alloys have a content of silicon and an amount of metallic magnesium substantially in excess of 0.1%.

5. The method of claim 3, wherein the molten bath of sodium chloride contains a minor proportion of cryolite.

HENRY LINDENBERGER.
ALFRED SUGAR.